(12) United States Patent
Vazquez Romero et al.

(10) Patent No.: US 11,920,559 B2
(45) Date of Patent: Mar. 5, 2024

(54) FLOATING PLATFORM FOR HIGH-POWER WIND TURBINES

(71) Applicants: DRAGADOS S.A., Madrid (ES); FHECOR INGENIEROS Y CONSULTORES, S.A., Madrid (ES); FUNDACION INSTITUTO DE HIDRAULICA AMBIENTAL DE CANTABRIA, Santander-Cabtavrua (ES); UNIVERSIDAD DE CANTABRIA, Santander-Cantabria (ES)

(72) Inventors: Miguel Vazquez Romero, Madrid (ES); Noelia Gonzalez Patiño, Madrid (ES); Elena Martin Diaz, Madrid (ES); Alejandro Perez Caldentey, Madrid (ES); José María Ortolano Gonzalez, Madrid (ES); Raúl Guanche Garcia, Santander-Cantabria (ES); Victor Ayllon Martinez, Santander-Cantabria (ES); Francisco Ballester Muñoz, Santander-Cantabria (ES); Jokin Rico Arenal, Santander-Cantabria (ES); Marcos Cerezo Laza, Santander-Cantabria (ES); Iñigo Javier Losada Rodríguez, Madrid (ES)

(73) Assignees: DRAGADOS S.A., Madrid (ES); FHECOR INGENIEROS Y CONSULTORES S.A., Madrid (ES)

( * ) Notice: Subject to any disclaimer, the term of this patent is extended or adjusted under 35 U.S.C. 154(b) by 403 days.

(21) Appl. No.: 17/418,828

(22) PCT Filed: Dec. 28, 2018

(86) PCT No.: PCT/ES2018/070839
§ 371 (c)(1),
(2) Date: Jun. 27, 2021

(87) PCT Pub. No.: WO2020/136288
PCT Pub. Date: Jul. 2, 2020

(65) Prior Publication Data
US 2022/0065226 A1    Mar. 3, 2022

(51) Int. Cl.
*F03D 13/25* (2016.01)
*B63B 1/10* (2006.01)
(Continued)

(52) U.S. Cl.
CPC .............. *F03D 13/25* (2016.05); *B63B 1/107* (2013.01); *B63B 5/20* (2013.01);
(Continued)

(58) Field of Classification Search
CPC ........... F03D 13/25; B63B 1/107; B63B 5/20; B63B 2001/126; B63B 2001/128;
(Continued)

(56) References Cited

U.S. PATENT DOCUMENTS 10,202,170 B2 *  2/2019  Dagher ................... F03D 13/25
10,215,161 B2 *  2/2019  Viselli ................... B63B 35/003
(Continued)

FOREIGN PATENT DOCUMENTS

CN    102758446 A    10/2012
CN    102758447 A    10/2012
(Continued)

*Primary Examiner* — Anthony D Wiest
(74) *Attorney, Agent, or Firm* — ASLAN LAW, P.C.

(57) ABSTRACT

A floating platform for high-power wind turbines, comprising a concrete substructure, said concrete substructure forming the base of the platform, which remains semi-submerged in the operating position, and consisting of a square lower slab on which a series of beams and five hollow reinforced concrete cylinders are constructed, distributed at the corners
(Continued)

and the center of said lower slab; a metal superstructure supported on the concrete substructure and forming the base for connection with the wind turbine tower, said tower being coupled at the center thereof; and metal covers covering each of the cylinders, on which the metal superstructure is supported and to which vertical pillars are secured, linked together by beams, which join at the central pillar by an element whereon the base of the wind turbine tower is secured.

20 Claims, 6 Drawing Sheets

(51) Int. Cl.
*B63B 1/12* (2006.01)
*B63B 5/20* (2006.01)
*B63B 35/44* (2006.01)

(52) U.S. Cl.
CPC ... *B63B 2001/126* (2013.01); *B63B 2001/128* (2013.01); *B63B 2035/442* (2013.01); *B63B 2035/446* (2013.01); *F05B 2240/93* (2013.01)

(58) Field of Classification Search
CPC ........ B63B 2035/442; B63B 2035/446; B63B 75/00; B63B 77/10; B63B 2039/067; B63B 5/14; F05B 2240/93; F05B 2240/95; Y02E 10/72; Y02E 10/727
See application file for complete search history.

(56) References Cited

U.S. PATENT DOCUMENTS 10,336,404 B2 * 7/2019 Dagher ................. B63B 21/20
11,052,971 B2 * 7/2021 Aguire Suso .......... B63B 1/107

FOREIGN PATENT DOCUMENTS

| CN | 104790426 A | 2/2015 |
| EP | 3342699 A1 | 7/2018 |
| WO | WO 2016172149 A1 | 10/2016 |

* cited by examiner

FLOATING PLATFORM FOR HIGH-POWER WIND TURBINES

CROSS-REFERENCE TO RELATED APPLICATIONS

This application claims priority to and is a 371 of international PCT Application No. PCT/ES2018/070839 filed on Dec. 28, 2018, the entire contents of which are hereby incorporated by reference.

TECHNICAL FIELD

The present invention belongs to the sector of structures in the open sea (offshore) and, in particular, to that of semi-submersible floating structures to serve as support for offshore wind turbines.

It therefore belongs to the fields of offshore and naval construction.

STATE OF THE ART

The field of offshore wind power is based on the technique developed in the sector of the oil and gas industry, adapting the designs and performance requirements to the particularities of this renewable energy source.

In general, offshore wind power distinguishes three different typologies depending on the type of foundation or the support conditions of the wind turbine:

Deep foundations, which are metal foundations made up of one or more piles, which are driven into the natural terrain for adequate transmission of the loads produced by the structure thereto.

Gravity foundations, wherein the loads of the structure are transmitted to the natural terrain at surface level starting from a monolithic structure.

Floating foundations, formed by floating platforms which support the wind turbine, which is located at such a depth that it makes any of the previous solutions unfeasible. In general, this type is associated with locations very far from the coast, wherein the draft is very large (and therefore the investment costs are higher) but, on the contrary, the wind resource is greater, being able to achieve wind energy productions sufficient to compensate for this fact.

In recent years, the development of various floating solutions has been taking place in order to act as support for offshore towers and wind turbines. More specifically, the type of floating foundations (or platforms) for offshore wind turbines can be divided into the following basic subtypes:

a) Semi-submersible platform
b) SPAR platform (Single Point Anchor Reservoir)
c) TLP platform (Tension Leg Platform)
d) SWAY platform (hybrid between a SPAR and a TLP)

One of the features of all of them is the importance acquired by the anchoring or mooring system, which is usually a significant portion in the cost of the solution. These are lines made up of elastomers, tendons, steel cables, chains, anchors, etc., which are designed and dimensioned according to the stresses they have to withstand starting from the loads transmitted to them by the assembly of the structure (platform, tower and wind turbine), the environmental loads and the restrictions on maximum movement imposed thereon.

This is one of the fundamental features which distinguish these types of floating foundations for offshore wind power from those used in the Oil & Gas sector, since in the former, in addition to the loads due to the weight itself, waves, wind and currents, the loads produced by the wind turbine itself during the operation thereof have a very high magnitude: horizontal thrusts and torsional moments originated by the wind turbine and transmitted to the floating structure through the tower which supports it.

Therefore, each of the previous subtypes of floating platforms for foundation of offshore wind turbines solves how to resist these loads in a different manner by generating movements which are always within the limits required for the operability of the turbines.

Thus, SPAR, TLP and SWAY platforms largely entrust the stability of the system to the performance of the mooring lines, which are made to work at high tensions, with the aim of restricting the movements of the tower and turbine.

Moreover, the semi-submersible platforms have greater naval stability, derived from the fact that they have a greater flotation capacity due to the greater displacement thereof. These platforms (which act as true floats) require somewhat less demanding mooring lines, for which reason the offshore installation thereof is less complex. However, they have the drawback that, by being larger, they require larger volumes of materials in order to be constructed, as well as more complex construction and assembly processes.

In this sense, most of the semi-submersible platforms for offshore wind turbines referred to in the current state of the art are metal structures, wherein the platform (float) is made up of cylinders with a horizontal or vertical axis joined by some structural system which stiffens the assembly.

On the previous conceptual basis and leaving the other subtypes (SPAR, TLP, SWAY) out of the analysis, among the semi-submersible platforms for offshore wind turbines referred to in the current state of the art, it is possible to distinguish the semi-submersible platforms for applications in the open sea, among which we highlight the documents ES2387232 (B2) and ES2387342 (B2) of the Fundación Instituto de Hidráulica Ambiental de Cantabria (Institute Foundation of Environmental Hydraulics of Cantabria), both referring to semi-submersible platforms: consisting of a central column and a plurality of outer columns (four or more in the first case, and three in the second), always joined by a slab in the lower area thereof, wherein both the columns and the slab are preferably made of reinforced concrete. The lower slab is reinforced by a plurality of beams which connect the base of each outer column to the base of the inner column and the base of each outer column to the base of each adjacent outer column.

Furthermore, each column has a reinforcing cross section with greater resistance at a certain intermediate height, as well as a set of beams which join at said height each outer column to the inner column and each outer column with each adjacent outer column.

This semi-submersible platform further comprises a mooring system formed by several mooring lines configured to be anchored to said cross section with greater resistance of each outer column, located at an intermediate height thereof.

In this manner, said cross section with greater resistance is essential since it is the most stressed area of the structure and where the stresses are most concentrated.

In another aspect, in the aforementioned documents, a construction method of this type of semi-submersible platform is described when the object thereof is to serve as support for offshore wind turbines. In this case, the construction phases comprise the steps of:

placement of an inner resistant base and at least four outer resistant bases on the base of a floating dock installation of a climbing formwork advance of the climbing for execution of the columns until reaching the level of the intermediate reinforcing cross section, such that a trunk is constructed on each resistant base, simultaneously with which the floating dock is submerged installation of formworks which cover the mouths of said trunks placement of a plurality of bracing beams which join each outer trunk to the inner trunk and each outer trunk to each adjacent outer trunk installation of vertical formworks in order to construct the cross section with greater resistance placement of frames of said areas with greater resistance concreting thereof and disassembly of the formworks new installation of the climbing formworks on the reinforcing cross sections already constructed climbing to a certain level until the trunks are constructed above the cross sections with greater resistance, simultaneously with which the floating dock is submerged and disassembly of the climbing formworks finishing of the upper portion of each trunk sinking of the floating dock until the platform is left floating transfer of the platform to the equipping dock vertical post-tensioning of the trunks installation at the equipping dock of a tower, a nacelle, a wind turbine rotor or auxiliary equipment From the previous construction phases, the complexity in the execution of the intermediate reinforcing cross section in each of the columns can be deduced. Mainly, this design of the semi-submersible platform and the associated construction process has the following drawbacks:

during the execution of the cylinders, the climbing must be stopped at an intermediate height, removing said climbing formworks and installing a new system of formworks in order to execute said reinforcing cross section. Once executed, the initial climbing system must be reinstalled in order to continue raising the columns to the final height thereof.

the interruption in the climbing process of the columns forces specific treatments to be carried out in the cross sections where the climbing has been interrupted in order to guarantee the tightness of the columns in the service phase, since these sections remain submerged in the service phase.

the bracing beams, made of reinforced concrete, must be placed from the equipping dock. Due to the dimensions thereof, from a practical point of view these beams must be placed one by one, requiring lifting means with an enormous capacity, both from land and sea.

But in addition to the previous drawbacks, the design of this intermediate bracing system causes a tensioned state to appear in the columns which forces vertical post-tensioning of all of them to be executed once the execution of the climbing has been completed. This post-tensioning system, in addition to making the solution more expensive, entails significant technical difficulties, derived from the height of the columns.

This is aggravated by the fact that the mooring lines remain connected to the cylinders in these intermediate reinforcing cross sections, causing bending in the columns which forces the post-tensioning system to be very unique and have a very high capacity.

Thus, the aforementioned inventions ES2387232 (B2) and ES2387342 (B2) propose concrete platforms which require the vertical post-tensioning of the columns, once executed. This feature implies the following main disadvantages:

Construction complexity: the execution of these vertical post-tensioning processes, on 30 m-tall cylinders, is very unique and complex:

Moreover, it requires the thickness of the column walls to be adapted, which will remain conditioned by the path that the pre-tensioning casings must follow and by the necessary coatings. This will affect the weight of the assembly of the platform, and the results from drafts and stability, which are strongly influenced by the weight of the assembly. It also forces greater drafts to be adopted during the manufacturing phases, this being a serious drawback for this type of solution.

Moreover, it forces complicated solutions to be adopted in order to achieve the anchoring of the tensioning cables to the lower end of the cylinders, which implies that operators must go down to that elevation once the raising of the columns is completed, or adopt systems of special anchors, with execution that is more difficult to guarantee a priori.

Increase in the cost of the solution: the complexity of design and execution implies a significant increase in the cost of the structure, which can compromise the competitiveness thereof.

Problems with durability: the durability criteria of post-tensioned concrete structures are demanding when they are affected by the offshore environment in areas battered by waves, as the structures are subjected to load cycles which are highly variable and difficult to quantify. Under these conditions, the tensioning systems are susceptible to corrosion, which can eventually compromise the structural integrity thereof. Furthermore, most of the advantages in this regard which were obtained from the use of concrete instead of metal structures are lost, since they once again increase spending on maintenance strategies.

Furthermore, these two solutions do not enable the cylinders to be constructed in a continuous manner, since they require the disassembly of the system of climbing formworks, the installation of other formworks, the execution of the reinforcing cross section, and the reassembly of the initial system of climbing formworks in order to finally be able to continue with the execution up to the upper elevation of the cylinders.

The invention object of this application aims to solve all these drawbacks, both from the point of view of the design of the platform and the construction processes.

DESCRIPTION OF THE INVENTION

The solution presented herein aims to solve the problem described in the preceding paragraphs.

It consists of a semi-submersible offshore platform for supporting high-power offshore wind turbines. Currently, 8 and 9 MW turbines are being developed commercially, while it is expected that turbines with 10 MW and more will be introduced to the market soon. This proposed platform serves as a platform for supporting high-power turbines of this type.

It is formed as a mixed structure made of concrete in some of the elements thereof and made of steel in others, in order to take advantage of the properties of these materials in the best manner possible.

This platform is designed to be located at depths (drafts) of more than 60 m, and preferably between 90 and 150 m. For greater depths, the proposed design is valid, needing to adjust the particular design of the mooring system.

As a complement to the description provided herein, and for the purpose of helping to make the features of the invention more readily understandable, the present specification is accompanied by a set of drawings which, by way of illustration and not limitation, represent the following:

EMBODIMENT OF THE INVENTION

The platform is made up of a concrete substructure (1), forming the base of the platform, whereon a metal superstructure (4) is supported, which in turn forms the connection with the base (9) of the wind turbine tower.

Figure 2:
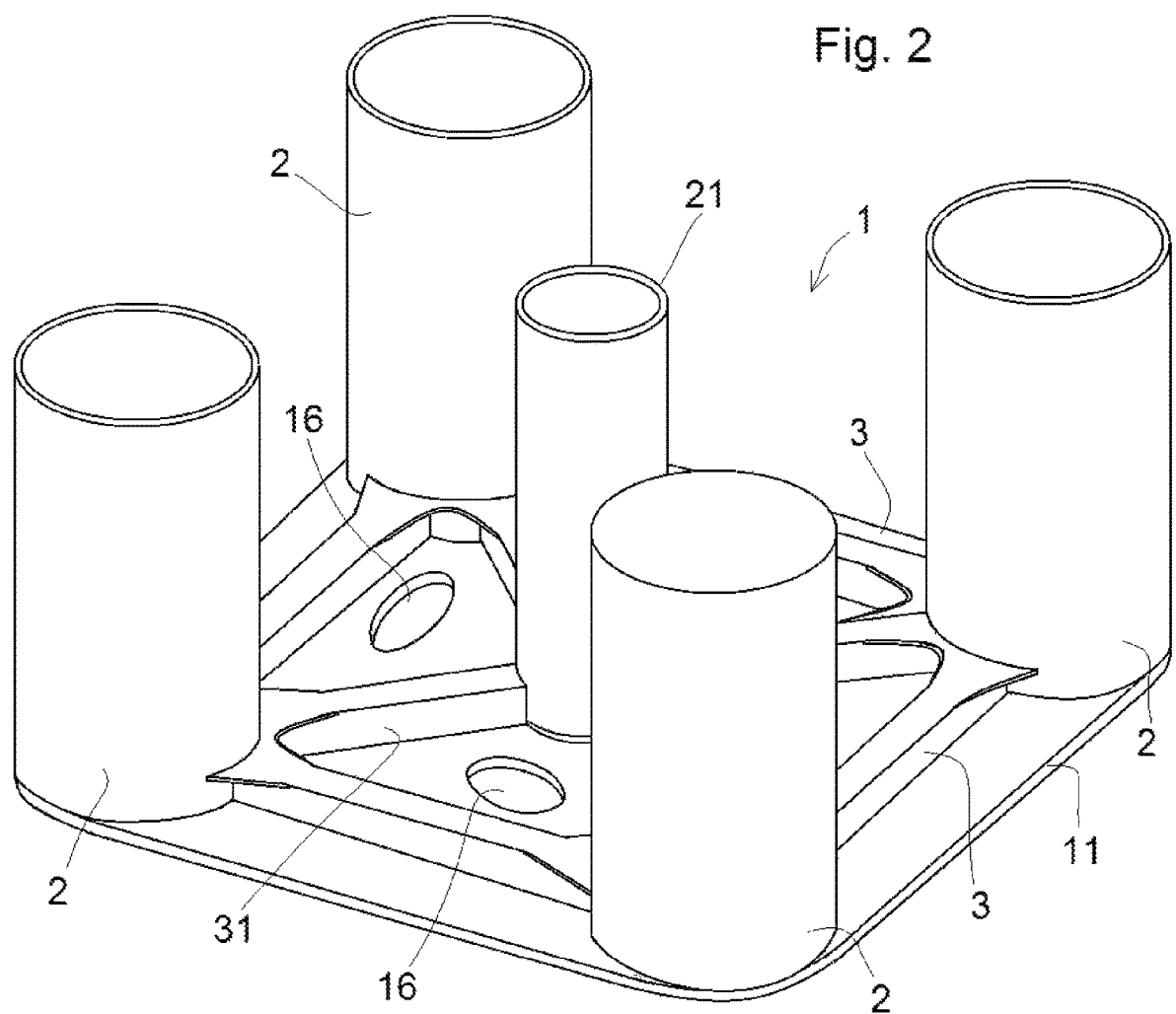
FIG. 2 is a view of the concrete substructure (1) which forms the base of the platform.

The concrete substructure (1), represented in detail in FIG. 2, includes: A square lower slab (11), five hollow reinforced concrete cylinders (2, 21) distributed at the corners and the centre of a square, and a series of beams (3, 31) which join the aforementioned cylinders (2, 21) to each other.

The lower slab (11) serves as the base of the platform. It is an element with a square configuration, preferably with rounded corners, made of reinforced concrete with a thickness of 0.50 m and 1.00 m at the base of the hollow cylinders (2, 21).

The lower slab (11) has four holes (16) in the area existing between two perimeter cylinders (2), the purpose of which is to enable the period of oscillation itself to be increased in the heave of the platform as a whole, until it is left at just over 18 seconds. This number is significant because it enables moving away from the usual periods of waves, such that the platform is prevented from resonating with the waves, which would amplify the heaves of the platform, significantly reducing the operability and production of the turbine, in addition to inducing unwanted stresses in the mooring lines and in the assembly of the structure. This solution implies a very significant advantage over other alternatives that may be referred to in the state of the art, wherein the periods of oscillation in the heave are considerably shorter and, therefore, they make them susceptible to resonating with usual waves in operating ranges. These holes have the shape of an ellipse, with axes having dimensions of 8×4.50 m each, which implies an opening percentage of 4% with respect to the total surface of the base platform. These holes optimise the resulting period itself with a very simple construction system, since they are made during the concreting itself of the rest of the base platform with reusable formworks which act as a negative.

On said lower slab (11) there are four cylinders (2), with an outer diameter of 14.60 m, forming a square, and a central cylinder (21) with a diameter of 9 m. The height of all the cylinders is equal to each other and ranges between 27 and 30 m from the slab (11). All the cylinders are executed by means of sliding from the slab (11), once this has been executed, and therefore, they remain stiffly joined to said slab (11) forming a single body with it and with the beams (3, 31). As already indicated, four of said cylinders (2) are arranged at the corners of the lower slab (11) and the other (21) in the centre thereof. The four outer cylinders (2) enable variable volumes of liquid ballast (water) to be housed therein, as well as a volume of solid ballast if necessary. These cylinders provide flotation and naval stability to the platform. The central cylinder remains without liquid ballast and enables the pumping system of said ballast system to be accommodated.

Located on the lower slab (11) are a series of radial beams (31) which join the outer cylinders (2) to each other and to the central cylinder (21); and other peripheral beams (3) which join the outer cylinders (2) at the centre of the bases thereof. All these beams (3, 31) provide structural stiffness to the slab (11), at the same time that they serve to brace the cylinders (2, 21) from below by remaining embedded in them.

Both assemblies of beams (3, 31) are hollow and monolithic with the slab (11). The beams are made of pre-tensioned concrete and have a square or rectangular cross section. This pre-tensioning, unlike the one proposed in some of the documents described above, is executed as dry in horizontal elements and does not have any special construction complexity. Moreover, it is located in permanently submerged elements for which reason the environmental conditions thereof are significantly better than that of the cylinders found in the tidal and splash area.

The metal superstructure (4) forms the transition element between the concrete substructure (1) which remains partially submerged, and the base of the wind turbine tower; said superstructure is made up of the following elements: Metal covers (5, 51) covering each of the five cylinders (2, 21); pillars (6, 61) which come out from the centre of the covers (5, 51) and two systems of beams (7, 71) which join said pillars (6, 61) in the centre with a metal element (8) whereon the base (9) of the wind turbine tower is secured.

The metal covers (5) have in the lower portion thereof circular flanges (52) which are anchored to the cylinders (2) by means of anchor bolts. Each of these covers (5, 51) has a radial system of stiffeners (53) welded to the plate of the metal cover (54).

A vertical pillar (6) with a height of about 9 m. and a diameter of 2.50 m comes out from the centre of each cover (5) of the outer cylinders (2). And, from the upper portion of the aforementioned pillars (6), two systems of beams come out:

A system of horizontal metal profiles (7), with a diameter of 1.50 m., which join the pillars (6) with a vertical axis to the four outer cylinders (2), forming a perimeter structure.

Four radial beams (71), with a variable metal cross section, such that they are inclined falling towards the outside, transmitting the load from the embedment of the tower (9) of the wind turbine to each of the four pillars (6) wherein they remain embedded.

A vertical cylindrical pillar (61), which has a height of about 9 m and a diameter of 2.50 m, comes out from the cover (54) of the central cylinder (21). In the upper portion thereof, this pillar remains crowned by a metal sheet with radial stiffeners, which forms an element (8) that has the same diameter as the base (9) of the wind turbine tower. This element serves to join the upper bracing system made up of the tubular profiles (7), the radial beams (71) and the central vertical pillar (61) by way of embedment. Furthermore, it serves to make the connection with the base (9) of the wind turbine tower.

Thus defined, this metal superstructure or transition element (4), in addition to serving as an upper bracing structure for the cylinders (2, 21), has the property of drastically reducing the shear stresses, bending and torsions transmitted to the concrete cylinders, for which reason it prevents the need for a post-tensioning system to be arranged therein. The cylinders with a diameter of 2.50 m have sufficient flexibility to drastically reduce the transmission of bending stresses to the infrastructure and function, in fact, as pivot joints, without the maintenance drawbacks and construction complexity that conventional pivot joints could have.

The metal pillar (61) which is located above the central cylinder (21), which has a smaller diameter and therefore less stiffness than the rest of the pillars (6), forces the bending loads to be transmitted directly to the side cylinders (2), while the central cylinder (21) only receives compression loads, which are much easier to resist. By having a cross section with a low stiffness compared to the assembly, the same effect of reducing tensions in the central concrete cylinder (21) is achieved, without the difficulty implied by it having a smaller diameter than that of the outer cylinders (2) and, therefore, a greater tendency to concentrate stresses.

Defined as such, this metal superstructure has an approximate weight of 1,440 tons.

There are also other elements in this foundation which complete this basic and essential configuration for the operation thereof; namely:

A system equivalent to the double hull in order to cope with accidental impacts from boats. It is a cylindrical metal structure formed by sheets with a thickness of 10 mm which remains attached to the inside of the side cylinders (2) and which prevents, in the event of an accidental impact from a boat, the uncontrolled inlet of water into the cylinder.

An active ballast system, consisting of an assembly of pipes which run through the inside of the lower hollow beams (3, 31), as well as a set of pumps housed inside the central cylinder (21). This system makes it possible to transfer water from some cylinders (2) to others if necessary in order to compensate for heels which may occur in the service phase due to the operation of the wind turbine and the loads from waves, wind and currents.

A mooring system consisting of four lines (10), formed by chains each with a length of about 565 m, which make up catenaries. At the ends of each of these chains, the anchors which remain secured to the seabed are arranged. At the other end, these mooring lines remain connected to the slab at each of the corners thereof by fairleads, with forwarding from that point to the upper portion of the concrete cylinders, wherein a monkey board is arranged wherein a winch that serves to manage the lines is housed.

Figure 1:
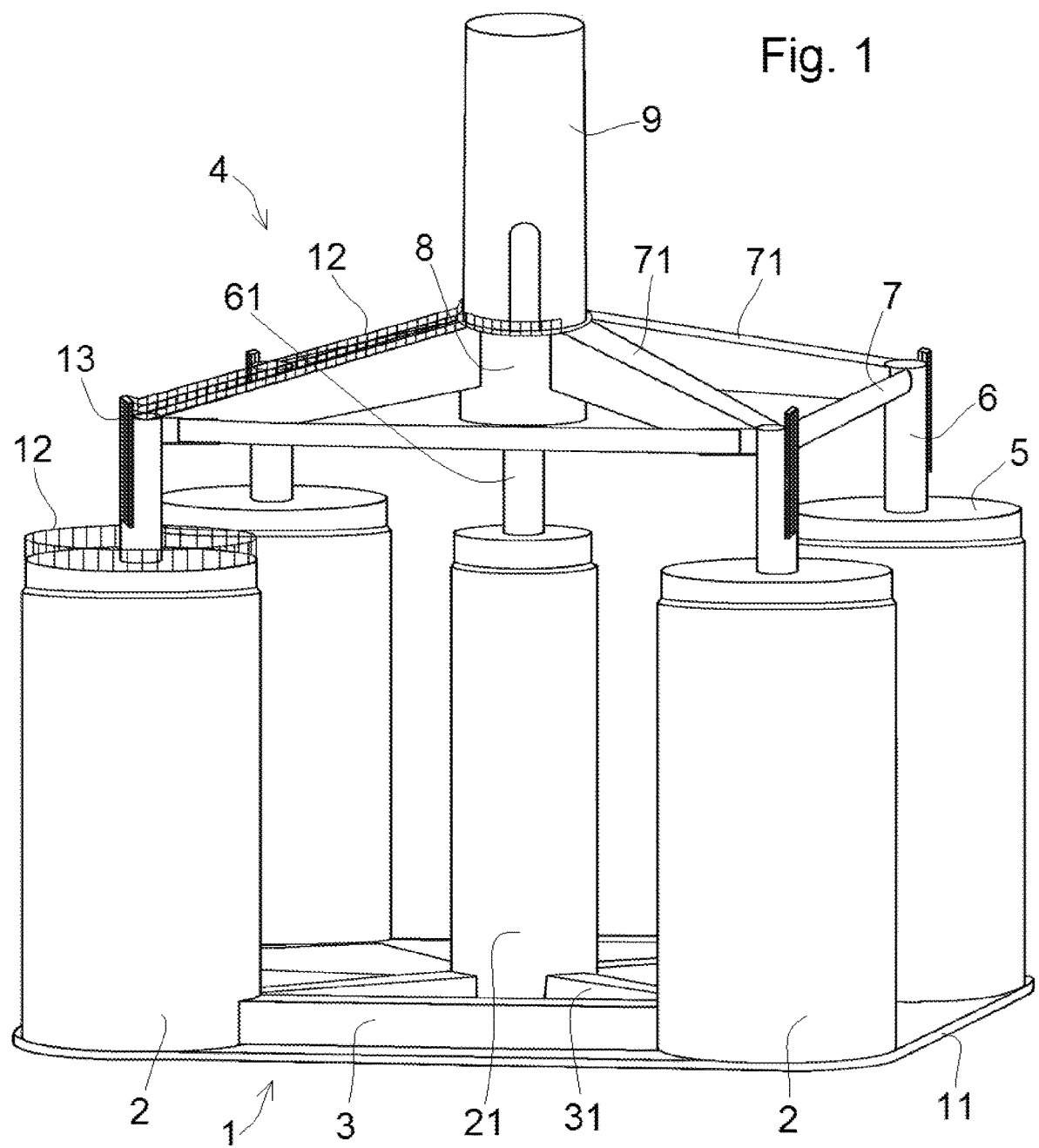
FIG. 1 shows a general perspective view of a platform made in accordance with the present invention.
Figure 3:
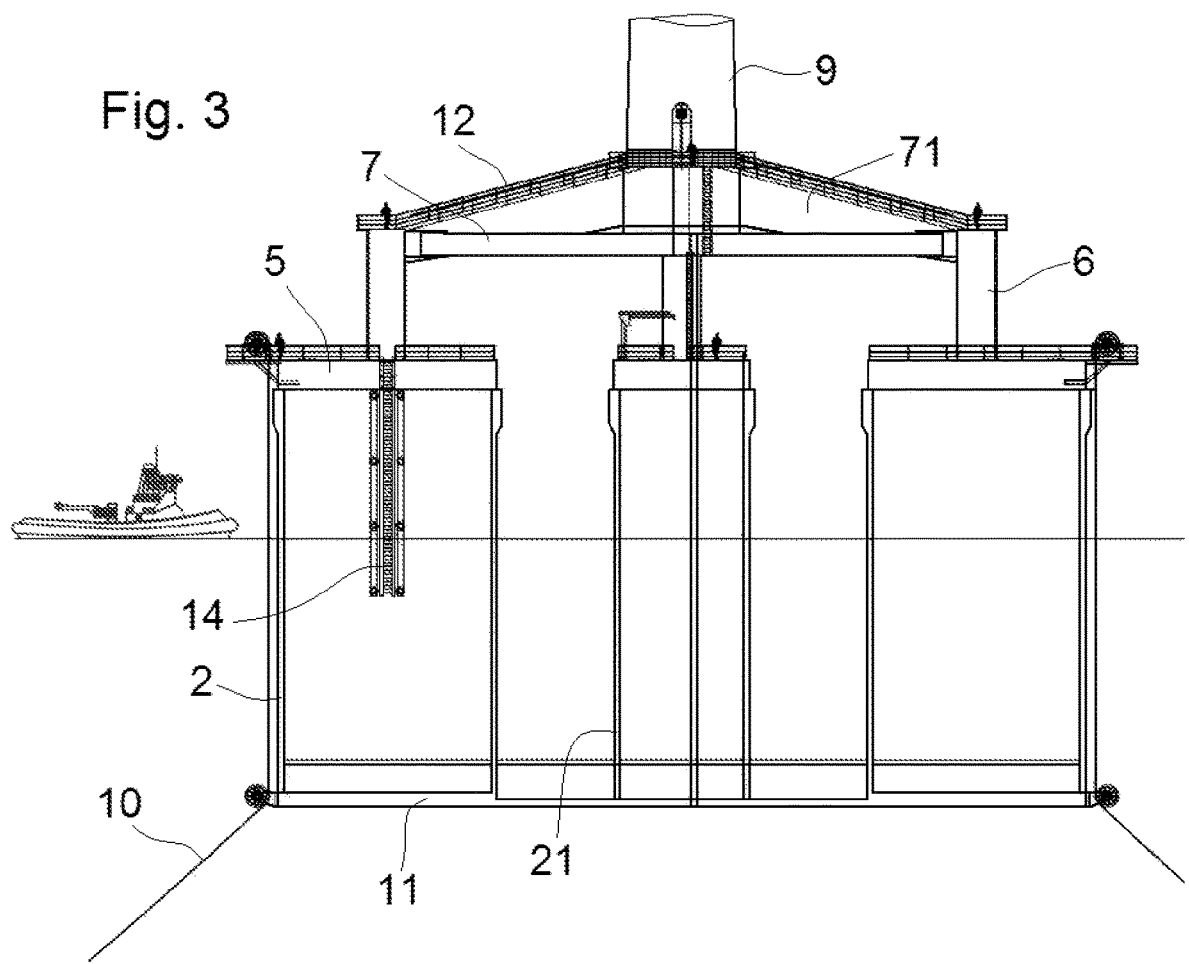
FIGS. 3 and 4 show corresponding elevation and plan views of a platform with a wind turbine (15) assembled thereon.
Figure 4:
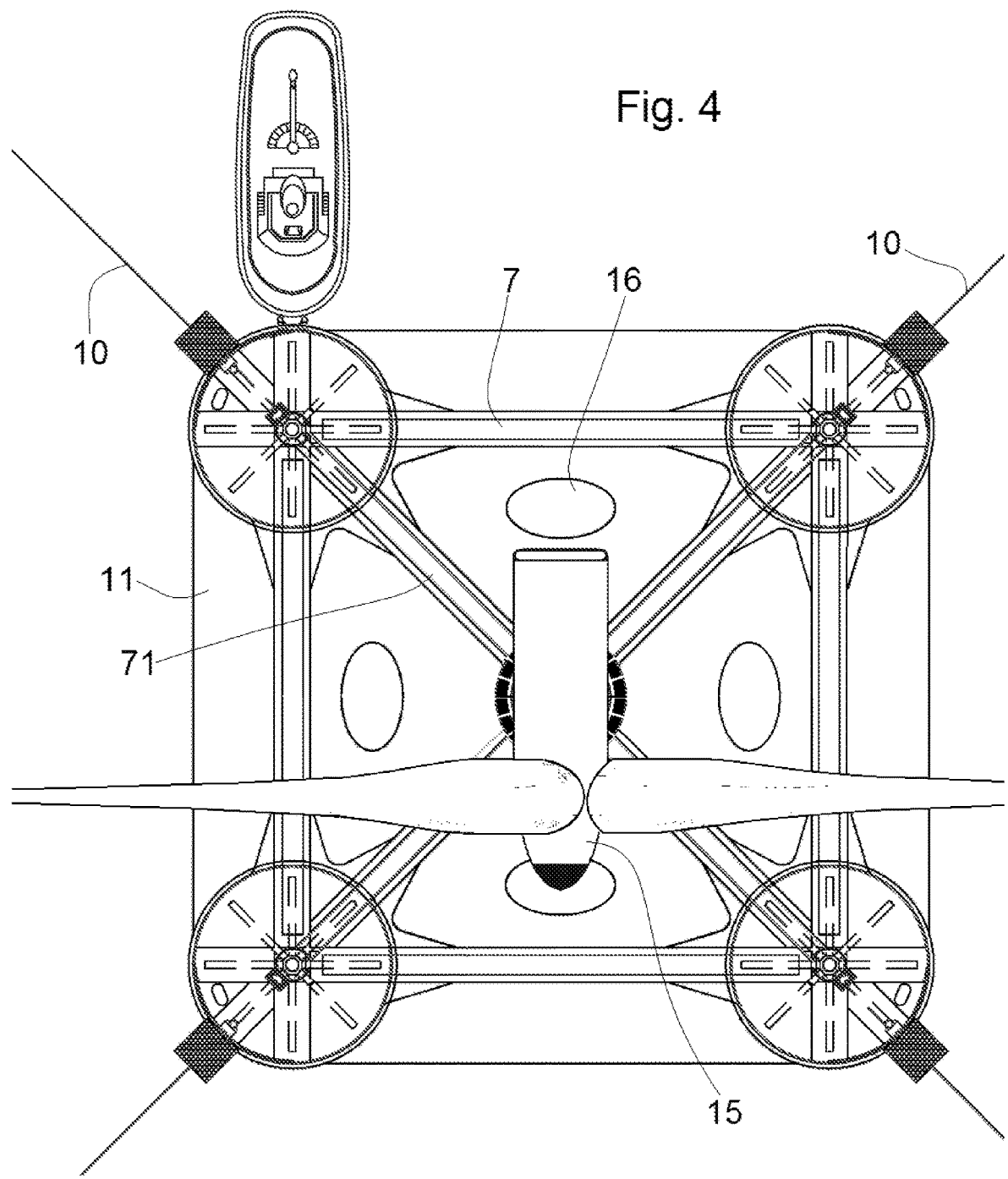
Figure 5:
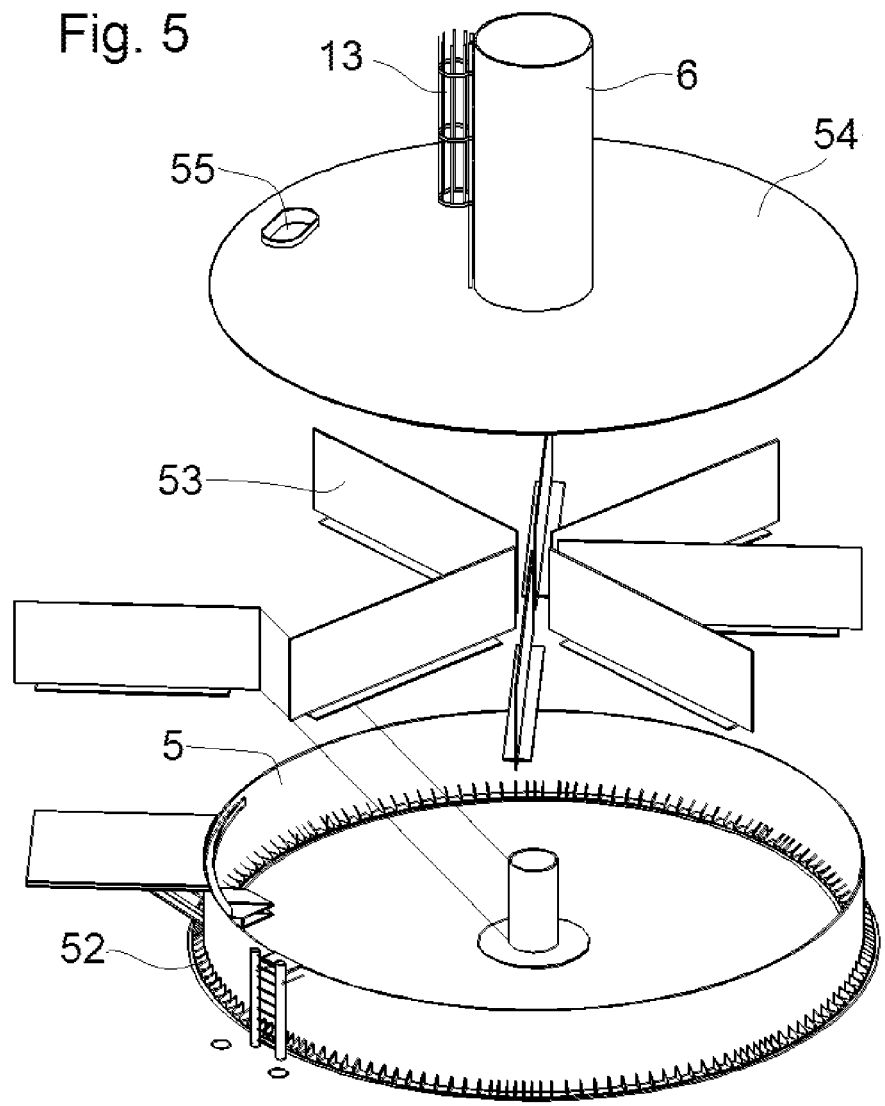
FIGS. 5 and 6 show in corresponding exploded views the portion of the metal superstructure (4) which is supported on the side cylinders (2) and on the central cylinder (21), respectively.
Figure 6:
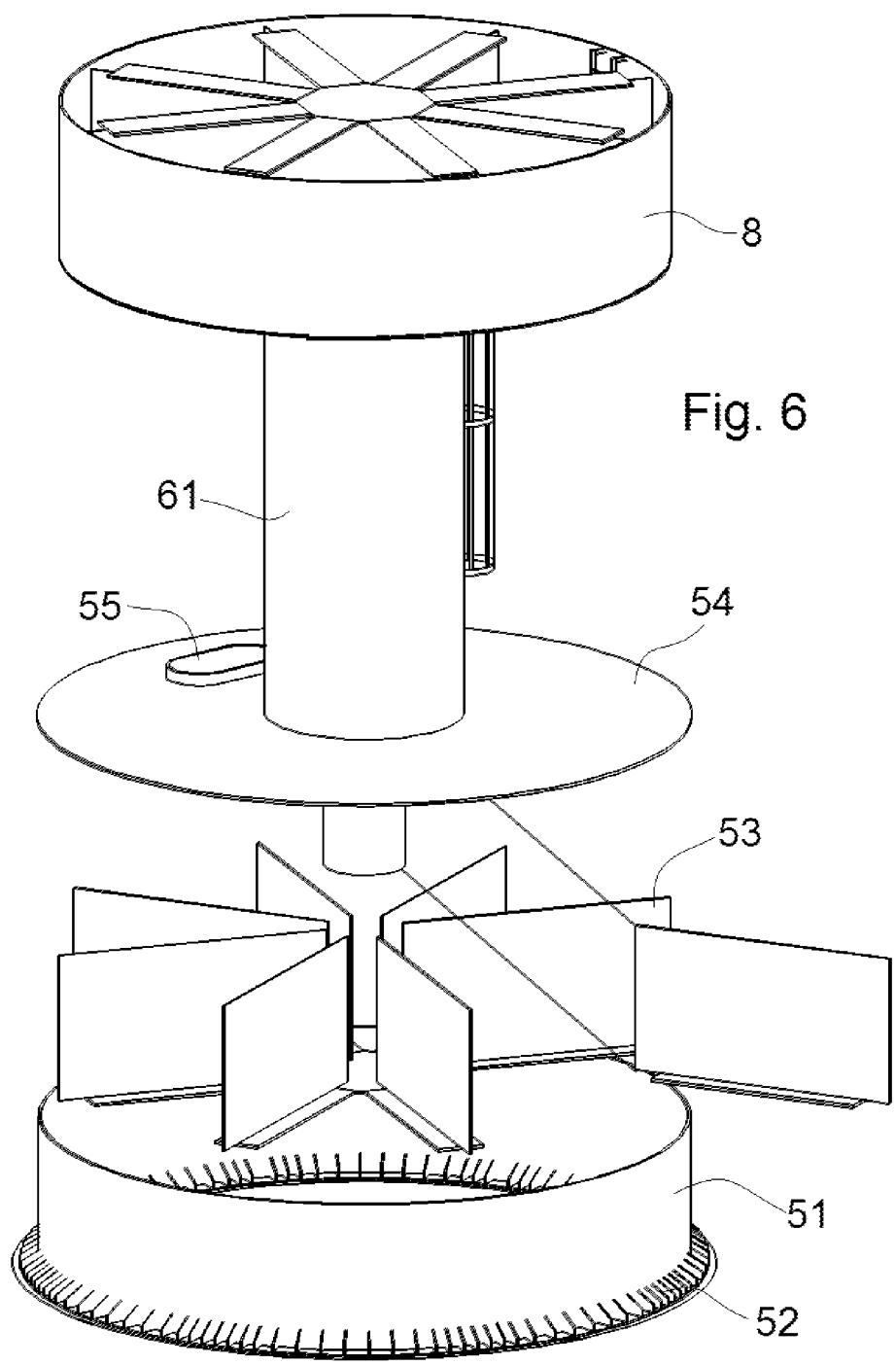

Both on the covers (5, 51) of the cylinders (2, 21), and on the upper surface of the beams (71) there are protective guardrails (12) which make these surfaces passable (in FIG. 1, guardrails (12) have only been represented on one of the beams (71), with the aim of clearly showing the design of said beams in the others). Likewise, stairs (13) are arranged on the pillars (6, 61) which enable the passage from the level of the covers (5) to the base of the column (9) of the wind turbine without more difficulty than the change in height. Finally, on the outside of at least one of the outer cylinders (2) there is a boat landing system (14), which remains partially submerged, to which the boats that provide supplies to the platform can safely approach for the transfer of personnel, equipment or supplies to the platform. (See FIGS. 3 and 4).

The covers (5, 51) are equipped with a manhole (55) through which it is possible to access the inside of the cylinders (2, 21), for the inspection or repair thereof, of the pumping equipment, etc. Preferably, a system of stairs is also installed on the inside thereof which facilitate this access.

Although the manufacturing and the operation of this platform are optimal when it is formed with four peripheral cylinders (2), there are no technical impediments so that the embodiment thereof is not possible with three cylinders forming an equilateral triangle, five, or even six peripheral cylinders (2) respectively forming a regular pentagon or hexagon; therefore, possible embodiments with a number of cylinders comprised between three and six are considered equivalent to the development of the present invention.

All the dimensions set out previously have been cited as a guide, they are not exact dimensions and therefore can be modified within wide margins.

The concrete to be used in the structure is conventional concrete, although low-density concretes can be used as an alternative, thus reducing the resulting draft. The reinforcement of the concrete is formed by conventional steel bars. Alternatively, the use of steel bars coated with resins, metal fibres, plastic fibres, GFRP bars, or any other system not susceptible to corrosion can be considered.

The construction process of these platforms is sequential, the design having been conceived to achieve an industrial process which reduces manufacturing rates as much as possible.

It has also been conceived to enable the installation of the tower and all the elements of the wind turbine to be inserted into the manufacturing process in the manufacturing dock in the port, wherein 4 successive manufacturing areas must be arranged (area no. 0 to area no. 3), which will make up the industrial production line of these platforms.

In the area 0, an auxiliary pontoon is arranged, with dimensions somewhat larger in layout than those of the slab (11). In that auxiliary pontoon, the pre-assembly of the rebar pontoon of the slab is performed.

In the area 1, a submersible pontoon is arranged with dimensions somewhat larger than those of the auxiliary rebar pontoon of the slab. This submersible pontoon is the main means of manufacturing and has four towers (one in each corner) which provide it with sufficient inertia in the flotation plane when it remains submerged. The following construction steps are performed therein:

1. The auxiliary rebar pontoon is inserted into the main submersible pontoon and, by means of an auxiliary structure supported thereon, it leaves the rebar hanging from the slab as a whole, which thus remains separated from the auxiliary pontoon. At that time, the main pontoon is slightly submerged, the auxiliary pontoon is removed, and the main pontoon is re-floated, at which point the rebar is lowered from the slab, leaving it finally supported on the main pontoon. At that time, it is ready to proceed to the installation of the formworks of the slab and the concreting thereof.
2. Once the concreting of the slab (11) has been completed, the lower beams (3, 31) made of pre-tensioned concrete are executed. It is a horizontal pre-tensioning which is executed as dry, for which reason it does not have any special complexity.
3. Next, the installation of the formworks of the cylinders (2, 21) starts. It involves sliding (non-climbing) formworks both for achieving high production rates and for ensuring the necessary sealing conditions of the cylinders.

4. When the cylinders have been raised to a height of about 12 m, the partially constructed structure has sufficient flotation capacity, for which reason at that time the sinking of the submersible pontoon starts in order to launch the structure in this partially manufactured state. The launching consists of sinking the submersible support pontoon below the draft of the floating platform, at which time it is separated from the pontoon and can be removed from it by pulling by means of a tugboat, which transfers the platform to the adjacent manufacturing area no. 2.

Performing this launching manoeuvre enables the necessary draft of the dock in this area no. 2 to not be excessive (about 15 or 16 m), since the main submersible pontoon has a depth of hold of about 6 m, for which reason performing the launching in subsequent phases would require much larger drafts that would make it unfeasible. With the platform afloat in the manufacturing area no. 2, the following operations are performed:

5. Initially, treating the concreting joint in order to continue with the concreting until the entire height of the cylinders is finished with the same formwork system that was used in area no. 1.
6. If required, the inner steel ferrule is then installed in each of the cylinders.
7. Placement of the metal elements which make up the upper cover of the five cylinders. This manoeuvre is performed by means of an overland crane located on the dock. These elements make up part of the superstructure (or transition element) described in preceding paragraphs. Once in place, the anchor bolts which stiffly join these covers to the walls of the cylinder are then tensioned.
8. Transfer of the platform to the manufacturing area no. 3. In this manufacturing step, the platform is transferred floating by means of pulling from a tugboat.

The rest of the manufacturing of the platform and the assembly of the wind turbine are carried out in said manufacturing area no. 3:

9. Ballasting of the platform by introducing seawater into the four outer cylinders. This manoeuvre is easily performed by means of remote-controlled valves installed in the lower portion of the walls of the cylinders. By means of the ballasting, it is possible for the partially constructed platform to be supported on the seabed of the dock in this area no. 3. The supporting bed has been previously levelled. In this manner, much greater precision can be achieved in the following manoeuvres to be performed.
10. Installation of the rest of the metal superstructure (transition element). The weight of the metal superstructure that remains to be installed on the platform is about 845 tons. In order to prevent having to carry out this operation by means of a large crane and to further prevent the need to significantly reinforce the metal structure so that it can be hoisted with such means, the decision was made to install this portion on board a pontoon as a catamaran. Thus, once assembled on land, this metal structure is installed on board a catamaran by means of a load-out manoeuvre similar to the one performed in other operations for the offshore industry. This load-out is performed on the manufacturing dock itself. The structure remains supported on the catamaran by means of a jacking system. The catamaran is then positioned in area no. 3, making it partially pass through the space existing between the cylinders. Alternatively, instead of a catamaran, two twin pontoons can be used, which are joined together by means of the metal structure itself. Once positioned there, the jacks are then to be lowered and the structure which remains installed on the platform is then dismantled. This involves a float over manoeuvre, which is sometimes used in the installation of offshore platforms or substations on the foundation systems thereof. Obviously in this case this manoeuvre has large simplifications, since it is performed in the sheltered waters of the manufacturing port and on the dock itself.
11. Welds for making the joint between the two already installed portions of the superstructure.
12. Installation in the same manufacturing area no. 3 of the tower, the nacelle, the rotor and the blades of the wind turbine by means of an overland crane located on the dock.

Manufacturing phases 10, 11 and 12 imply the successive increase in the weight of the floating device, for which reason throughout these phases, the deballasting of the cylinders is progressively carried out so that, once completed, the platform is floated, already completely constructed and ready to be towed to the installation site thereof in deep water.

Among the drawbacks and limitations which are overcome with this invention, the following should be highlighted:

The design of this platform implies a conceptual step in the design with respect to the previous proposals, since the feasibility of the application thereof to turbines with a high capacity and stressed by higher loads (from waves, wind, currents and the operation of the turbine itself) is not a simple step of scaling dimensions or capacities, but requires a new design like the one proposed herein.

In this sense, the technological barrier implied by making the loads to which the platform is subjected compatible is transferred in an original way; the response curves of the proposed new design enable these demands and the corresponding construction processes to be coped with in order to enable mass production of these platforms. It is known that, in order to maintain equivalent conditions of naval stability, the manner in which semi-submersible platforms cope with higher loads is by means of:

an increase in the dimensions thereof, which implies increasing the distance between the floats thereof, which results in an increase in the structural complexity and weight of the platform an increase in the work tensions of the mooring lines, which implies an increase in cost and a greater complexity of installation Therefore, the manner in which the platform responds to these stresses and the dynamic behaviour thereof are unique.

The design of this platform enables the weights to be distributed in the different portions of the structure such that, for a movement very similar to that of other platforms and global dimensions in layout, the stability conditions are improved in the service phase and in the intermediate manufacturing phases. The drafts are also reduced. Thus, for example, this platform in the service phase has a draft of 19 m in order to support a 10 MW turbine, with a displacement of about 14,000 tons, compared to 22 m for a 5 MW turbine of the experiences referred to above for semi-submersible concrete platforms, with a displacement of about 13,000 tons.

The metal structure is formed as a transition element which, in addition to bracing the cylinders with each other, serves to transmit mainly compression loads to the cylinders and to drastically reduce bending and torsions. This fact enables the need for any post-tensioning in the cylinders to be eliminated, preventing the aforementioned problems.

This metal structure, when connected to the central cylinder by means of a cross section with much less relative stiffness, transmits only compression forces to the central cylinder, as a pseudo-marked support, which enables the diameter of said cylinder to be reduced without needing to use any type of post-tensioning. From this fact, two additional ones are derived:

Lesser loads from waves on the platform.

Lower weight of the assembly, which reduces the drafts in manufacturing, towing and service phases.

The metal superstructure is limited to the superstructure element, which is outside the water and the splash area, for which reason the maintenance thereof is much easier than if it were located at lower elevations and in permanent contact with the seawater.

The inner steel ferrule that is installed inside the cylinders enables the stability of the platform to be ensured against situations of accidental impact from a boat. This solution is equivalent to a double hull solution, with the advantage that it is integrated into the very structure of the cylinders, and implies a clear competitive advantage compared to single hull solutions, whether they are made of concrete or metal.

The design prevents the need for intermediate bracing levels of the concrete cylinders, which would make the construction process very difficult. It also releases a large amount of loads to the central cylinder. In this manner, the side cylinders, in addition to the function thereof as floats, have a fundamental structural function, taking advantage of the resistant capacities of each element of the platform in the most efficient manner possible.

The concrete used is conventional, a necessary step to ensure the technical-economic viability of the concept.

The design enables the pre-tensioned concrete elements to be permanently submerged and in an area of the structure removed from the areas exposed to the loads from waves. Furthermore, they are horizontal pre-tensioning systems which are executed as dry, for which reason they can be considered as common. All of this enables this structural solution to be considered as perfectly viable and durable.

By having three axes of symmetry, the complexity in the active ballast system necessary during the service of the wind turbine is reduced as much as possible, since at rest the platform is balanced and not unbalanced.

The platform thus formed can be entirely constructed (including the assembly of the tower and the wind turbine) in a single 300 m long manufacturing dock, preventing the need to occupy large land areas or shipyards. Regarding the necessary drafts in said dock, this ranges around 16 m, which can be reduced in the case of slightly adapting the geometries of the different elements or using lighter concretes.

The platform thus formed can be manufactured in an industrial manner, optimising the different construction steps in sequential phases in one same dock which is formed as a complete production line, which enables the production of a complete platform (tower and wind turbine included) every 35 days.

The design of the construction process is directly focused on achieving the previous objectives for a platform which supports high-power wind turbines: concentrating the location of the construction phases, limiting the draft necessary in the manufacturing dock, simplifying the necessary manoeuvres and means and achieving a very high production rate. None of the references found in the state of the art simultaneously fulfils all the above conditions.

Once the nature of the invention has been described, as well as a preferred exemplary embodiment, it is evident that the invention is capable of industrial application, in the indicated sector.

Likewise, it is stated for the appropriate purposes that the materials, shape, size and arrangement of the elements described may be modified, provided that it does not imply altering the essential features of the invention claimed below:

The invention claimed is:

1. A floating platform for high-power wind turbines, of the type including a resistant base, which has a mooring line at each corner through which it is anchored to the seabed, being maintained in a semi-submerged position, on the base of which a central cylinder and at least four peripheral cylinders are constructed, all of them made of reinforced concrete, the central cylinder of which extends vertically in a wind turbine tower, wherein five hollow reinforced concrete cylinders include said central cylinder and said at least four peripheral cylinders, and wherein the floating platform comprising:
   a concrete substructure, forming the base of the platform, and consisting of:
     a square lower slab forming the base of the platform;
     a series of slab/base beams providing structural stiffness to the slab, being attached to and above the same, at the same time that they brace the five hollow reinforced concrete cylinders from below, by remaining embedded in them;
     said five hollow reinforced concrete cylinders distributed at the corners and the centre of the lower slab, executed by means of sliding from the slab, once this has been executed and stiffly joined forming a single body with said slab and with said series of slab/base beams which join them; and
   a metal superstructure, which supports a concrete substructure and forms the base for connection with the wind turbine tower, being coupled at the centre thereof, consisting of:
     metal covers covering each of peripheral cylinders and the central cylinder;
     vertical pillars which come out from the covers located on the five hollow reinforced concrete cylinders, which remain linked together by means of superstructure/pillar beams, and
     corresponding systems of said superstructure/pillar beams which join, on the one hand, the vertical pillars of the four peripheral cylinders to each other, and, on the other, diagonally join each pillar to the central pillar and to a central metal element, whereon the base of the wind turbine tower is secured, transmitting the load from the base to each of the four pillars, wherein radial beams of said superstructure/pillar beams remain embedded.

2. The floating platform, according to claim 1, wherein the peripheral cylinders house variable volumes of liquid ballast and/or a volume of solid ballast therein, in order to provide the platform with flotation and naval stability, while the central cylinder accommodates a system for pumping ballast water to the peripheral cylinders.

3. The floating platform, according to claim 2, wherein the lower slab has four elliptical holes in the area existing between two consecutive peripheral cylinders, calculated so that the period of oscillation itself in the heave of the platform as a whole is greater than 18 seconds, thus moving away from the usual periods of waves, in order to prevent the platform from resonating with the waves.

4. The floating platform, according to claim 2, wherein the said series of slab/base beams which provide structural stiffness to the base, which are arranged radially joining the peripheral cylinders to the central cylinder and peripherally joining the peripheral cylinders at the centre of the bases thereof to each other, they are hollow and are manufactured as monolithic with the slab, made of concrete pre-tensioned as dry by means of horizontal elements, with a square or rectangular cross section, and are embedded in the five hollow reinforced concrete cylinders in the subsequent manufacturing thereof.

5. The floating platform, according to claim 2, wherein the metal covers covering each of the peripheral cylinders and the central cylinder have circular flanges in the lower portion thereof which are anchored to the five hollow reinforced concrete cylinders by means of anchor bolts and internally it has a radial system of stiffeners welded to the plate of the upper metal cover on which the corresponding vertical pillar is secured.

6. The floating platform, according to claim 3, wherein the said series of slab/base beams which provide structural stiffness to the base, which are arranged radially joining the peripheral cylinders to the central cylinder and peripherally joining the peripheral cylinders at the centre of the bases thereof to each other, they are hollow and are manufactured as monolithic with the slab, made of concrete pre-tensioned as dry by means of horizontal elements, with a square or rectangular cross section, and are embedded in the five hollow reinforced concrete cylinders in the subsequent manufacturing thereof.

7. The floating platform, according to claim 3, wherein the metal covers covering each of the peripheral cylinders and the central cylinder have circular flanges in the lower portion thereof which are anchored to the five hollow reinforced concrete cylinders by means of anchor bolts and internally it has a radial system of stiffeners welded to the plate of the upper metal cover on which the corresponding vertical pillar is secured.

8. The floating platform, according to claim 6, wherein lower hollow beams of said series of slab/base beams accommodate a set of pipes which run through the inside thereof connecting the peripheral cylinders to the central cylinder, which accommodates an assembly therein for pumping ballast water to the peripheral cylinders.

9. The floating platform, according to claim 6, wherein the metal covers covering each of the peripheral cylinders and the central cylinder have circular flanges in the lower portion thereof which are anchored to the five hollow reinforced concrete cylinders by means of anchor bolts and internally it has a radial system of stiffeners welded to the plate of the upper metal cover on which the corresponding vertical pillar is secured.

10. The floating platform, according to claim 8, wherein the metal covers covering each of the peripheral cylinders and the central cylinder have circular flanges in the lower portion thereof which are anchored to the five hollow reinforced concrete cylinders by means of anchor bolts and internally it has a radial system of stiffeners welded to the plate of the upper metal cover on which the corresponding vertical pillar is secured.

11. The floating platform, according to claim 10, wherein the metal pillar which is located above the central cylinder is crowned by a metal sheet with radial stiffeners, which forms an element with the same diameter as the base of the wind turbine tower, which serves to join the upper bracing system that is made up of perimeter beams of said superstructure/pillar beams, radial beams of said superstructure/pillar beams and the central vertical pillar by way of embedment.

12. The floating platform, according to claim 11, wherein the metal pillar which is located above the central cylinder has a smaller diameter than the rest of the peripheral pillars, transmitting the bending loads directly to the peripheral cylinders, so that the central cylinder only receives compression loads, the assembly of the superstructure behaving to this end as a pivot joint.

13. The floating platform, according to claim 12, wherein the peripheral cylinders have a cylindrical metal structure, which remains attached to the inside thereof and which prevents, in the event of an accidental impact with a boat, the uncontrolled inlet of water into the corresponding cylinder.

14. A method of constructing the floating platform for high-power wind turbines of claim 1, said method comprising:
  a) pre-assembly of a rebar of the slab and the arrangement thereof in a submersible pontoon, with dimensions somewhat larger than said slab, and installation of formworks of the slab and the concreting thereof;
  b) execution of lower concrete beams by means of a horizontal pre-tensioning which is executed as dry;
  c) installation of sliding formworks in the centre and at the corners, wherein the five hollow reinforced concrete cylinders are concreted up to an intermediate height, above a flotation line of the platform;
  d) sinking of the submersible pontoon in order to launch a substructure in this partially manufactured state, below a draft of the floating platform, at which time it is separated from the pontoon and is removed from it by pulling by means of a tugboat, in order to be transferred to another adjacent manufacturing area;
  e) continuation of a concreting process until an entire height of the five hollow reinforced concrete cylinders is finished with the same formwork system which was used previously;
  f) placement of metal elements which make up upper covers of the five hollow reinforced concrete cylinders by means of an overland crane located on the dock and securing thereof by means of anchor bolts which stiffly join them to walls of the five hollow reinforced concrete cylinders;
  g) transfer of the platform to another manufacturing area floating by means of pulling from a tugboat;
  h) ballasting of the platform by introducing seawater into the four peripheral cylinders until the partially constructed platform is supported on the seabed of the dock in this area;
  i) installation of additional metal superstructure(s) and performing welding necessary to make a joint between two already installed portions of the metal superstructure; and
  j) installation of a tower, a nacelle, a rotor and blades of the wind turbine by means of an overland crane located on the dock, while the deballasting of the five hollow reinforced concrete cylinders is progressively carried out so that, once an assembly process is completed, the platform remains afloat, completely constructed and ready to be towed to the installation site thereof in deep water.

15. The method according to claim 14, wherein said method is developed in a dock-factory that includes four areas which make up an industrial production line, each of which comprises:
   a) a previous area, wherein an auxiliary pontoon is arranged, with dimensions somewhat larger in layout than those of the slab of the platform, wherein the pre-assembly of the rebar of the slab is performed;
   b) a first area, wherein a submersible pontoon with dimensions somewhat larger than those of the auxiliary pontoon that supports the rebar of the slab is arranged, to which the rebar of the slab as a whole is passed, leaving it previously suspended and separated from the auxiliary pontoon, in order to then remove it and replace it with the main pontoon, whereon the rebar is finally deposited, ready to proceed to the installation of the formworks of the slab and the concreting thereof and that of the cylinders up to an intermediate height, all of this as the submersible pontoon descends, maintaining the concreting area above the water level at all times;
   c) a second area, to which the platform is transferred once the submersible pontoon which fully supported it has been sunk, until the platform is left floating, then being towed to this manufacturing area, wherein the platform under construction remains floating and is sunk gradually as the concreting of the cylinders and the placement of the metal elements which make up the upper covers thereof continue; and
   d) a third area, to which the platform is transferred by floating and pulling it from a tugboat, wherein the seabed has been levelled and has a draft such that when ballasting the platform it remains supported on the seabed in a semi-submerged position, in arrangement to then install the rest of the metal superstructure, the tower, the nacelle, the rotor and the blades of the wind turbine by means of an overland crane located on the dock, while the deballasting of the cylinders is progressively carried out so that, once the assembly process is completed, the platform remains afloat, completely constructed and ready to be towed to the installation site thereof in deep water.

16. The method, according to claim 15, wherein the installation phase of the rest of the metal superstructure on the covers of the cylinders is performed on board a pontoon as a catamaran, wherein said superstructure is installed on the manufacturing dock itself, once assembled on land, leaving it supported by means of jacks on the catamaran; in order to then position the catamaran in the area wherein the partially assembled platform is located, making it pass partially through the space existing between the cylinders and, once positioned above the substructure in the final securing site thereof, proceeding to lower the jacks until it is left installed thereon.

17. The floating platform, according to claim 1, wherein the lower slab has four elliptical holes in the area existing between two consecutive peripheral cylinders, calculated so that the period of oscillation itself in the heave of the platform as a whole is greater than 18 seconds, thus moving away from the usual periods of waves, in order to prevent the platform from resonating with the waves.

18. The floating platform, according to claim 17, wherein the metal covers covering each of the peripheral cylinders and the central cylinder have circular flanges in the lower portion thereof which are anchored to the five hollow reinforced concrete cylinders by means of anchor bolts and internally it has a radial system of stiffeners welded to the plate of the upper metal cover on which the corresponding vertical pillar is secured.

19. The floating platform, according to claim 1, wherein the said series of slab/base beams which provide structural stiffness to the base, which are arranged radially joining the peripheral cylinders to the central cylinder and peripherally joining the peripheral cylinders at the centre of the bases thereof to each other, they are hollow and are manufactured as monolithic with the slab, made of concrete pre-tensioned as dry by means of horizontal elements, with a square or rectangular cross section, and are embedded in the five hollow reinforced concrete cylinders in the subsequent manufacturing thereof.

20. The floating platform, according to claim 1, wherein the metal covers covering each of the peripheral cylinders and the central cylinder have circular flanges in the lower portion thereof which are anchored to the five hollow reinforced concrete cylinders by means of anchor bolts and internally it has a radial system of stiffeners welded to the plate of the upper metal cover on which the corresponding vertical pillar is secured.

* * * * *